(No Model.)
P. J. EDMUNDS.
PRISMATIC MAGNIFYING SPECTACLES.
No. 439,130. Patented Oct. 28, 1890.
 FIG.3 
 FIG.4 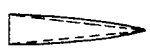
 FIG.5 

Witnesses:
Inventor:
Percy James Edmunds
By Richards
Attorneys.

UNITED STATES PATENT OFFICE.

PERCY JAMES EDMUNDS, OF SYDNEY, NEW SOUTH WALES.

PRISMATIC MAGNIFYING SPECTACLES.

SPECIFICATION forming part of Letters Patent No. 439,130, dated October 28, 1890.

Application filed August 14, 1889. Serial No. 320,678. (No model.)

*To all whom it may concern:*

Be it known that I, PERCY JAMES EDMUNDS, a subject of the Queen of Great Britain and Ireland, and a resident of Sydney, in the Colony of New South Wales, Australia, have invented certain Improvements in Prismatic Magnifying Spectacles Suitable for Normal-Sighted Persons, of which the following is a specification.

The spectacles to be constructed according to this principle differ from all ordinary spectacles in the following very important particular. Instead of being primarily intended to correct or make allowance for optical defects, malformations, or other structural deficiencies in the eye, they may be employed to enable persons with normal sight to make binocular use of the magnifying and other properties of convex glasses without strain or injury to the eyes. The principle consists in adding the effect of prismatic deviation to the effect produced by the convexity alone by means of a particular prismatic form combined with lenticular surfaces to be given to the glasses of spectacles.

In order to make the principle clear, it will be necessary to briefly refer to the effect of the present common form of convex spectacles upon normal-sighted persons.

Figure 2:
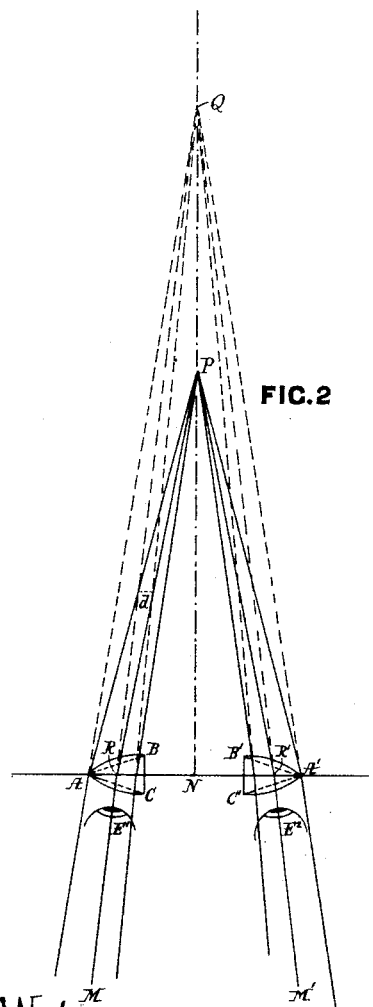
Figure 1:
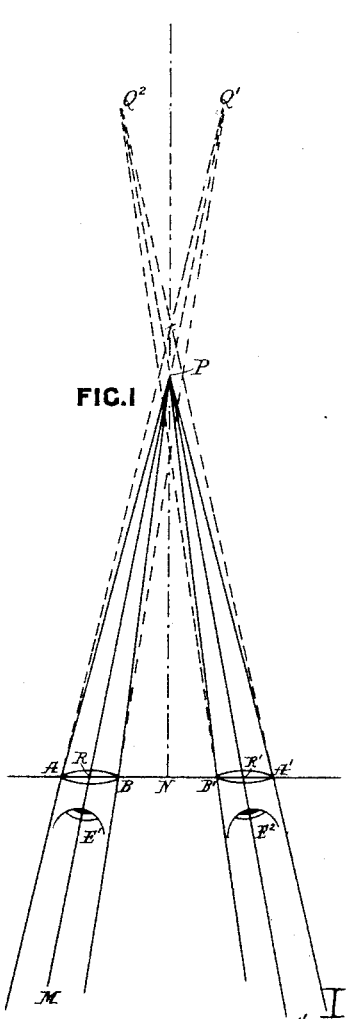

In the accompanying sheet of drawings, Figure 1 shows the effect of the convex spectacles as worn by a normal-sighted person. Fig. 2 is a diagram illustrating the use of lenses shaped and arranged according to my invention. Figs. 3, 4, and 5 show various other forms of lenticular prisms adapted to be used in carrying my invention into effect.

Referring first to Fig. 1, let A B and A' B' be two convex lenses, E' and E² the two eyes and P a luminous point. Then, by the well-known optical properties of lenses, the image of P, formed by A B, is moved a certain distance farther from the lens—say to Q'. Similarly the image of P, formed by A' B', would appear at Q². Since Q' does not coincide with Q² a "blur" or confusion is introduced, produced by the double image, and the normal-sighted person experiences undue muscular strain of the muscles of the eyes.

The oject of this invention is to blend the two images Q' and Q² into a single image. The manner of attaining this end is as follows: The lenses used are prism-shaped with lenticular convex surfaces, the thick edges of the prism being adjacent to one another and the prismatic angles pointing outward. This will have the effect of lessening the convergence to a degree that will exactly correspond to the lengthening of the focus if the lenses be constructed according to a correct calculation.

In Fig. 2, A B C and A' B' C' are these prism-shaped lenses. P, as before, is a supposed luminous point. Were it not for the particular prismatic form of the lenses there would be two images formed, as before; but the prismatic power of the prisms is so adjusted that the principal axis of the rays that strike each lens is bent in the direction R M R' M', respectively, and it follows that in this manner both images are made to blend together into one image at Q. Thus by the use of such properly-calculated lenticular prisms it follows that the converging power of the two eyes may be kept in harmony with the focusing power of each eye, and the image of P is actually removed, both as regards convergence and focusing, to Q. What holds for a single point P will, by elementary principles in optics, approximately hold for all other points similarly situated.

It is to be understood that the invention does not merely consist in the use of lenticular prisms. These have been long known.

The invention consists in the binocular application of lenticular prisms, constructed and calculated so as to carry into effect the principle explained, so as to blend together the two images which would be produced by ordinary lenses only, and thus enable normal-sighted persons to obtain magnification for any purpose without strain to the eyes.

Spectacles or similar binocular contrivances constructed with lenticular prisms made by this formula are intended, first, to enable persons who have to observe objects at close distances with both eyes to do so with ease and distinctness. This class would include persons engaged in such trades as engraving, watch-making, &c.; second, to enable students and others who have strained their eye-sight, or are likely to strain their eye-sight by the nature of their occupation, to read or do their work with all the benefit of greater apparent distance and the corresponding and accompanying magnification; third, for weak-sighted persons generally, and many obvious daily uses which might arise, too numerous to mention, where binocular magnification is required.

Various possible forms which might be given to the lenticular prisms are shown in Figs. 3, 4, and 5, it being understood in all cases that the alteration in the apparent position of the object produced by the lenticular power is accompanied by a properly-calculated prismatic power, so as to compensate for the double image and the confusion which would result were the prismatic lenses not used.

The following are the mathematical formulæ upon which the amounts of lenticular and prismatic power requisite are based, and by which the shape of the lenticular prism is calculated to produce a given effect:

*Problem 1.*—To find the radii of curvature of the lenticular surfaces A B and A C. (See Fig. 2.) This may be done by first finding the principal focal distance necessary.

Let $NP = p$
$NQ = q$
and $RN = a$ (that is one-half the distance between the pupils of the eye.) Also let $f$ be the principal focal distance required. Then by applying a well-known formula we have $$\frac{1}{f} = \frac{1}{PR} - \frac{1}{QR}$$

that is, $$\frac{1}{f} = \frac{1}{\sqrt{p^2 + a^2}} - \frac{1}{\sqrt{q^2 + a^2}}$$

$$\therefore f = \frac{\sqrt{(p^2 + a^2)(q^2 + a^2)}}{\sqrt{(q^2 + a^2)} - \sqrt{(p^2 + a^2)}} \quad (1)$$

This is the formula by which $f$ is found in terms of the known quantities $p$, $q$, and $a$. From this it follows that any radii may be given to the curved surfaces A B and A C, provided the following formula be satisfied:

$$(n-1)\left\{\frac{1}{R} + \frac{1}{R'}\right\} = \frac{1}{f}$$

where $n$ means the index of refraction of the glass and $R$ and $R'$ the radii required. Hence the lenticular prisms may be calculated to assume a biconvex, plano-convex, or meniscus form.

*Problem 2.*—To find the amount of deviation required to be produced—that is, the angle P R Q—and also to find the necessary prismatic rectilineal angle B A C. (See Fig. 2.)

Let $d$ = angle of deviation PQR.
Now $d$ = angle QRN − angle PRN.
$\tan d = \tan(QRN - PRN)$.

$$\tan d = \frac{\dfrac{q}{a} - \dfrac{p}{a}}{1 + \dfrac{pq}{a^2}}$$

$$d = \tan^{-1}\left\{\frac{a(q-p)}{a^2 + qp}\right\} \quad (2)$$

Hence $\tan d$ being known, $d$ itself can be found from tables, as required; and since B A C is a small-angled prism, then approximately $$d = (n-1) \times \text{angle BAC}$$

(where $n$ means the index of refraction, as before,) therefore the angle $$BAC = \frac{d}{n-1} = \frac{\tan^{-1}\left\{\dfrac{a(q-p)}{a^2 + pq}\right\}}{n-1} \quad (3)$$

It will be understood that whatever be the nature of the curved surfaces, the prismatic angle always means the outer angle that is formed by the right lines drawn between the three corners of the lens—*i. e.*, the angle between the straight lines (shown dotted in Fig. 2) joining B A and C A.

The above formulæ (as is customary in optical calculations) are approximate only and those which would be used in practice; but the data could, if necessary, be calculated with other more extended formulæ, provided the principle of blending the images by compensating prisms is followed out.

The following calculations give an example of the way in which the foregoing formulæ are worked out in practice. Suppose a person of normal sight requires spectacles that will enable him to examine with both eyes an object really at six inches distance from the bridge of the nose, but which, with the aid of the improved glasses, is to appear as though situated at ten inches distance, and suppose the distance between the pupils of his eyes be two and one-half inches.

Then $p = 6$
$q = 10$
$a = 1\frac{1}{4}$

Then by the formula 1, $$f = \frac{\sqrt{\left(36 + \dfrac{25}{16}\right)\left(100 + \dfrac{25}{16}\right)}}{\sqrt{100 + \dfrac{25}{16}} - \sqrt{36 + \dfrac{25}{16}}} = 15\tfrac{1}{2} \text{ inches (nearly)}$$

Similarly applying formula 2, $$d = \tan^{-1}\left\{\frac{\dfrac{5}{4}(10-6)}{\dfrac{25}{16} + 60}\right\} = \tan .0812182 = 4° .38' \text{ (nearly)},$$

and supposing the index of refraction of the glass to be $\frac{3}{2}$ we get the requisite angle of the prism $$= \frac{4°.38'}{\frac{3}{2}-1} = 9°.16'$$

Hence the glasses must be ground so as to have a focal length of fifteen and one-half inches and a prismatic angle of $9°.16'$. These formulæ hold as they stand for normal-sighted and myopic persons. An increase in the lenticular power is however necessary for hypermetropic persons where the point Q, Fig. 2, does not lie within the focal range of his eyes. In this case the observer may either wear the improved spectacles and his own together, or the focal distance of the convex surfaces A B and A C may be calculated by the following formula:

$$f = \frac{10\,f'\,\sqrt{p^2+a^2}}{10\,f' - (f'-10)\sqrt{p^2+a^2}} \qquad (4)$$

where $f'$ means the focal length of the convex lens he is accustomed to wear for obtaining distinct vision at ten inches distance. For instance, in the former illustrative problem, if the person naturally required convex spectacles of twenty inches focus to see distinctly at ten inches distance, he would require about a focal distance of eight and four-fifth inches in the lenticular surfaces of these improved lenses. (By formula 4.)

The lenses may be mounted in any frame or holder that may be found most suitable for the purpose for which they are to be used.

Having now particularly described and ascertained the nature of my said invention, and in what manner the same is to be performed, I declare that what I claim, is—

In binocular spectacles, the combination of prisms having convex, plano-convex, or meniscus lenticular surfaces, situated with their bases toward each other, and arranged to throw two images of a single object, as P, to another single point, as Q, substantially as set forth.

In witness whereof I have hereunto set my hand in presence of two witnesses.

PERCY JAMES EDMUNDS.

Witnesses:
 MANFIELD NEWTON, C. E.,
 P. W. KENNA.